Sept. 29, 1959  H. M. BUCK  2,906,120
PRESSURE MEASURING DEVICE
Filed April 18, 1957
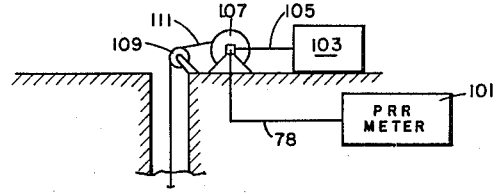
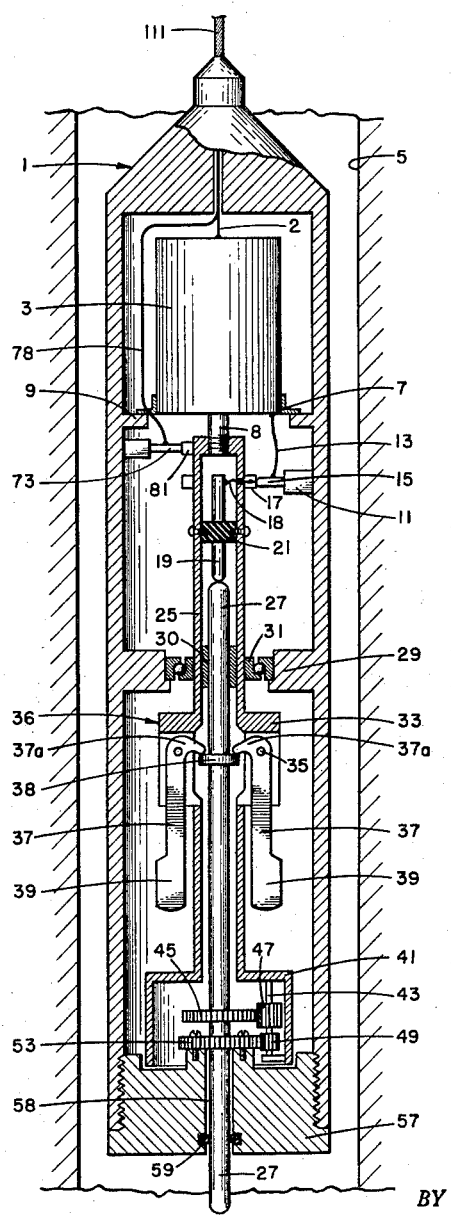
INVENTOR.
Henry M. Buck,
BY John B. Davidson
ATTORNEY.

United States Patent Office 2,906,120
Patented Sept. 29, 1959

2,906,120

PRESSURE MEASURING DEVICE

Henry M. Buck, Houston, Tex., assignor, by mesne assignments, to Jersey Production Research Company, Houston, Tex, a corporation of Texas Application April 18, 1957, Serial No. 653,644

6 Claims. (Cl. 73—151)

This invention relates to pressure measuring devices and more particularly to devices for measuring pressure in a borehole.

In connection with earth drilling operations directed to the search for petroleum deposits in the earth, it is desirable to know the pressures encountered during the drilling of boreholes and particularly those pressures at the bottom of the borehole. For a number of reasons it is particularly desirable that the pressure measurement be continuous and that the record of the pressure measurement be instantaneously available at the earth's surface. For example, should a high pressure zone be pierced by the drilling bit, it is desirable to close blowout preventers as soon as possible and to increase the weight of the drilling mud to avoid the possibility of a wasteful and dangerous "blow-out" which can delay drilling operations and possibly result in unnecessary loss of valuable petroleum deposits. Additionally, if a log of borehole pressures as a function of borehole depth is available, the evaluation of records obtained by other logging techniques may be enhanced by correlation therebetween.

Pressure measuring devices known to the prior art usually include temperature sensitive force elements against which the pressure to be measured is balanced. Manifestly, the wide range of ambient temperatures encountered in boreholes cannot but have an adverse effect upon the accuracy of pressure measurements obtained utilizing such temperature sensitive devices. Furthermore, pressure measuring devices that are unduly complex or fragile are unsuited for use in connection with earth drilling operations in view of the rough treatment and adverse operating conditions to which they must necessarily be subjected. While devices such as shown in U.S. Patent No. 2,637,998 provide continuous pressure measurements, manifestly they are so fragile as to be unsuited for application where they would be subjected to rough treatment.

Accordingly, one object of this invention is to provide a simple, rugged pressure measuring device that will provide at a remote location a continuous record of the pressure measured thereby.

Another object is to provide a pressure measuring device that is inherently non-temperature sensitive and adapted for continuous measurement of pressure and transmission of the results of the pressure measurements to a remote location.

Yet another object is to provide a pressure measuring device particularly adapted for use in running a pressure log of a borehole drilled in the earth.

Still another object is to provide a pressure measuring device wherein the pressure to be measured is balanced against a force not subject to variations as a result of variation of the operating temperature encountered thereby.

Other objects and features of the invention will become apparent upon consideration of the following description thereof when taken in connection with the accompanying drawing wherein the single figure is an elevational view partially in cross-section of a preferred embodiment of the invention.

According to one aspect of the invention, the pressure to be measured is balanced against an oppositely directed force derived from a rotating flyball assembly. The pressure to be measured exerts a force in one direction on a piston; the flyball assembly exerts a force in the other direction on the piston, the magnitude of which is functionally related to the speed of revolution of the flyball assembly. The flyball assembly is driven by an electric motor which is energized through electrical contact means adapted to be closed by the piston when the piston is moved a given distance under the influence of the pressure to be measured. Rotation of the flyball assembly will move the piston in the opposite direction, opening the electrical switch, de-energizing the motor, and slowing the speed of rotation of the flyball assembly until the switch is again closed. Manifestly, the motor speed will hunt about a given speed that will result in a force exerted on the piston substantially equal to the force exerted by the external pressure. Thus, by measuring the speed of rotation of the flyball assembly by a rotating electrical contact, a tachometer, or other suitable means well known to the art, the magnitude of the pressure can be very exactly determined.

More particularly and with reference to the single figure of the drawing, there is shown an embodiment of the invention particularly suited for running pressure logs on the borehole. A sonde 1 is shown suspended within a borehole 5 at the end of a cable 111 wound upon a reel 107 and supported at the top of the borehole by a sheave 109 in the usual manner. The sonde is closed at the lower end thereof by a bottom plug 57, the function of which is to allow access to the interior of the sonde for installation and maintenance of the apparatus to be described below, while providing a pressure tight seal between the interior and exterior of the sonde. The bottom plug 57 screwthreadedly engages the bottom of the casing of sonde 1 and has an axial bore 58 for the purpose of reciprocally accommodating a piston 27. A packing gland such as O-ring 59 is provided for the purpose of maintaining the pressure-tight seal between the exterior and interior of the sonde while permitting free reciprocation of the piston along the longitudinal axis of the sonde. Piston 27 extends through the bottom plug 57 a sufficient distance so that the pressure external to the sonde at all times is exerted against the bottom of the piston to bias the piston toward the interior of the sonde (i.e., in an upward direction as shown).

An electric motor 3 is provided which is secured within the sonde near the upper end thereof, as shown, by brackets 5 which are bolted to an annular shoulder 9, which shoulder is integral with the casing of sonde 1. Electric motor 3 may be either a universal motor or a D.C. motor. If a D.C. motor is used, it may have a permanent magnet field or it may be of the type utilizing series, shunt, or compound wound fields. The function of motor 3 is to rotate the flyball assembly to be described below.

For the purpose of balancing the force exerted on piston 27 by the pressure external to the sonde, a flyball support assembly 36 is provided which includes shaft 25, flyball support housing 33, and gear housing 41. The upper end of shaft 25 is connected to the screw-threaded end of motor shaft 8. Shaft 25 is additionally supported by ball-bearing member 31 which is affixed to annular shoulder 29 integral with the sonde casing. The purpose of flyball housing 33 is to provide a pivotal support for flyballs 39. Each of the flyballs 39 is connected to the flyball housing 33 by means of an arm 37 and a pivot bearing 35. A goose-neck section 37a on arm 37 bears against an annular flange 38 on piston 27 so that tendency to outward movement of each of flyballs 39 occasioned by the initial energy thereof will force piston 27 downwardly, as shown.

Piston 27 is additionally supported within hollow shaft 25 by means of a sleeve bearing 30 (preferably of copper or other conductive metal so as to establish low-resistance electrical contact between piston 27 and shaft 25) which may be positioned either above or below flyball housing 33. As shown in the figure, sleeve bearing 30 is positioned above flyball housing 33.

To overcome static friction between piston 27 and sleeve bearing 30 and O-ring 59, the rotational movement of shaft 25 is imparted to piston 27 through a differential gear train including driven gear 45 connected to piston 27, driving gear 47 connected to shaft 43, which is rotatively secured to gear housing 41, reaction gear 49 (secured to shaft 43) and reaction gear 53 (secured to end member 57).

Power for energization of electric motor 3 is obtained from a power source 103 at the earth's surface. This electric energy is coupled to the sonde through cable 105 and is brought to the electric motor within the sonde by conductor 2 within cable 111. Conductor 2 is connected directly to the motor windings, the electric circuit being completed through the conductive sheath on cable 111, the sonde casing, shaft 25 through the bearings thereof, sleeve bearing 30, piston 27, conductive rod or contact member 19, conductor 18, slip ring 17, brush 15, and electrical conductor 13, which is connected to electric motor 3. Manifestly, piston 27 and shaft 25 should be made of an electrically conductive material, and electric conductor 18 and slip ring 17 must be suitably insulated from shaft 25. Contact bar 19 is rigidly secured to the shaft 25 by support member 21 which is of an electrical insulating material. Brush 15 is anchored to the sonde casing by support member 11.

For the purpose of measuring the speed of rotation of shaft 25, a contact segment 81 is connected to the shaft. This contact segment should be small in size. With each revolution of shaft 25, segment 81 is contacted by brush 73. Brush 73 and segment 81 are connected to a source of direct current (not shown) at the earth's surface so that a voltage pulse is transmitted through conductor 78 to a pulse repetition rate meter 101. Meter 101 may be any of the conventional pulse repetition rate meters utilized in connection with radar systems. If desired, it is also feasible to use a small tachometer, the output voltage or frequency of which may be transmitted to the surface. The tachometer conveniently could be connected to the shaft of motor 3.

Piston 27 is conveniently positioned within shaft 25 so that it contacts rod 19 when flyball assembly 36 is not rotating and a slight pressure differential exists between the exterior and interior of sonde 1. The distance that piston 27 need move along the longitudinal axis of shaft 25 need not be particularly large but it should be great enough so that arcing between rod 19 and piston 27 will not occur when the two members are separated.

Gears 45 and 47 should have straight teeth so that the longitudinal movement of piston 27 will meet with a minimum amount of resistance therefrom.

In operation, let it be assumed that flyball assembly 36 is at rest and that the pressure differential exists between the exterior and interior of sonde housing 1 sufficient to cause piston 27 to contact bar 19 and that the various conductors are energized by suitable power sources at the earth's surface. Electric motor 3 will be energized and will begin to rotate. Flyballs 39 will try to move outwardly as a result of the inertia thereof and a downward force will be exerted on piston 27 through flange 38. However, as long as the upward force exerted on the piston by the external pressure is greater than the downward force exerted thereon by the flyballs, outward movement of the flyballs will be prevented. In due course, motor 3 will accelerate until the downward force exerted by the flyballs 39 overcomes the force exerted by the external pressure. Piston 27 will move downwardly de-energizing the motor and slowing the speed of the flyball assembly. The downwardly acting force exerted by the flyballs will decrease until piston 27 again contacts bar 19, re-energizing motor 3 and again accelerating flyball assembly 36. Thus, there will be a slight hunting action as the rotational speed of the flyball assembly increases and decreases and the piston 27 and conductive bar 19 are engaged and disengaged. The rotational speed of the flyball assembly manifestly will be indicative of the pressure to be measured inasmuch as the force exerted on the piston by the flyballs 39 will be functionally related to the speed of rotation of the flyball assembly and is substantially equal and opposite to the external pressure as soon as the hunting action mentioned above commences.

For certain applications it may be undesirable to directly interrupt the electric current energizing motor 3. In such event an auxiliary relay may be utilized, the actuating coil of which may be energized and de-energized through the contact assembly including bar 19 and piston 27. The contacts of the relay may be connected so as to energize and de-energize the windings of the electric motor.

Manifestly, the objects set forth above are met by the present invention. None of the pressure measuring elements are temperature sensitive, and the structure is quite rugged and trouble-free. The pressure measurements are readily transmitted over considerable distances by electrical means and inherently are quite accurate.

Although the embodiments disclosed in the preceding specification are preferred, other modifications will be apparent to those skilled in the art which do not depart from the broadest aspects of the scope of the invention.

What is claimed is:

1. A pressure measuring device comprising: a housing; flyball support means supported within said housing for angular rotation therewithin; electric motor means coupled to said flyball support means adapted to angularly rotate said flyball support means; said flyball support means being hollow along its rotational axis and pivotally supporting a plurality of flyball means symmetrically about said rotational axis; piston means adapted to reciprocate along said axis extending through said housing support means, sealing means sealing the interior of said housing means against variations in pressure external thereto so that a biasing force will be exerted on said piston means to move said piston means along said axis in accordance with variations in pressure external to said housing means; a flange on said piston means against which force is exerted by said flyball means responsive to rotation of said flyball support means, the forces exerted on said piston by said flyball means and said pressure external to said housing being mutually opposed; electrical contact means secured to said flyball support means therewithin adapted to be engaged by said piston to energize said electric motor responsive to a predetermined differential force exerted thereon by said flyball means and said pressure external to said housing; and means for measuring the rotational speed of said flyball support means.

2. A pressure measuring device comprising: a housing; flyball support means supported within said housing for angular rotation therewithin; electric motor means coupled to said flyball support means adapted to angularly rotate said flyball support means; said flyball support means being hollow along its rotational axis and pivotally supporting a plurality of flyball means symmetrically about said rotational axis; piston means adapted to reciprocate along said axis extending through said housing support means, sealing means sealing the interior of said housing means against variations in pressure external thereto so that a biasing force will be exerted by said piston means to move said piston means along said axis in accordance with variations in pressure external to said housing means; a flange on said piston means against which force is exerted by said flyball means responsive to rotation of said flyball support means, the forces exerted on said piston by said flyball means and said pressure external to said housing being mutually opposed; electrical contact means secured to said flyball support means therewithin adapted to be engaged by said piston to energize said electric motor responsive to a predetermined differential force exerted thereon by said flyball means and said pressure external to said housing; means for measuring the rotational speed of said flyball support means, and differential gearing means driven by said flyball support means for imparting rotational movement to said piston means relative to said housing.

3. Apparatus for measuring pressure in a borehole, comprising: a sealed cylindrical housing having closed end sections, flyball support means including a hollow shaft and a plurality of arms symmetrically disposed about the longitudinal axis of said shaft, each arm pivotally supporting a flyball for pivotal movement thereof; bearing means supporting said flyball support means within said housing so that said flyball support means is free for rotational movement, said longitudinal axis of said bearing support means being in substantial alignment with the longitudinal axis of said cylindrical housing; a piston supported by said housing and said flyball support means for reciprocating movement on said longitudinal axes, said piston extending through one end of said housing so as to be biased toward the opposite end of said housing by a positive pressure differential between the exterior and interior of said housing; means for biasing said piston toward said one end upon outward movement of said flyballs from said longitudinal axes; an electric motor coupled to said flyball support means for rotation thereof; normally-open electrical switch means adapted to be closed by movement of said piston toward said opposite end of said housing for energizing said electric motor; and means for measuring the rotational speed of said flyball support means.

4. Apparatus for measuring pressure in a borehole, comprising: a sealed cylindrical housing having closed end sections, flyball support means including a hollow shaft and a plurality of arms symmetrically disposed about the longitudinal axis of said shaft, each arm pivotally supporting a flyball for pivotal movement thereof; bearing means supporting said flyball support means within said housing so that said flyball support means is free for rotational movement, said longitudinal axis of said bearing support means being in substantial alignment with the longitudinal axis of said cylindrical housing; a piston supported by said housing and said flyball support means for reciprocating movement on said longitudinal axes, said piston extending through one end of said housing so as to be biased toward the opposite end of said housing by a positive pressure external to said housing relative to the interior of said housing; means for biasing said piston toward said one end upon outward movement of said flyballs from said longitudinal axes; an electric motor coupled to said flyball support means for rotation thereof; normally-open electrical switch means adapted to be closed by movement of said piston toward said opposite end of said housing for energizing said electric motor; and means for measuring the rotational speed of said flyball support means, a packing gland within said housing and surrounding said piston for sealing the interior of said housing against variations in pressure external thereto; and differential gearing means driven by said flyball support means for angularly rotating said piston means on said longitudinal axes.

5. A pressure measuring device comprising: a housing; flyball support means supported within said housing for angular rotation therewith; electric motor means coupled to said flyball support means adapted to angularly rotate said flyball support means; said flyball support means being hollow along its rotational axis and pivotally supporting flyball means for pivotal movement away from said rotational axis in accordance with the speed of rotation of said flyball support means; piston means adapted to reciprocate along said axis extending through said housing support means; sealing means sealing the interior of said housing means against variations in pressure external thereto so that a biasing force will be exerted on said piston means to move said piston means along said axis in accordance with variations in pressure external to said housing means; a flange on said piston means against which force is exerted by said flyball means responsive to rotation of said flyball support means, the forces exerted on said piston by said flyball means and said pressure external to said housing being mutually opposed; electrical contact means secured to said flyball support means therewithin adapted to be engaged by said piston to energize said electric motor responsive to a predetermined differential force exerted thereon by said flyball means and said pressure external to said housing; and means for measuring the rotational speed of said flyball support means.

6. A pressure measuring device comprising: a housing; flyball support means supported within said housing for angular rotation therewithin; electric motor means coupled to said flyball support means adapted to angularly rotate said flyball support means; said flyball support means being hollow along its rotational axis and pivotally supporting flyball means for pivotal movement of said flyball means away from said axis in accordance with the speed of rotation of said flyball support means; piston means adapted to reciprocate along said axis extending through said housing support means, sealing means sealing the interior of said housing means against variations in pressure external thereto so that a biasing force will be exerted by said piston means to move said piston means along said axis in accordance with variations in pressure external to said housing means; a flange on said piston means against which force is exerted by said flyball means responsive to rotation of said flyball support means, the forces exerted on said piston by said flyball means and said pressure external to said housing being mutually opposed; electrical contact means secured to said flyball support means therewithin adapted to be engaged by said piston to energize said electric motor responsive to a predetermined differential force exerted thereon by said flyball means and said pressure external to said housing; means for measuring the rotational speed of said flyball support means, and differential gearing means driven by said flyball support means for imparting rotational movement to said piston means relative to said housing.

References Cited in the file of this patent

UNITED STATES PATENTS

| | | |
|---|---|---|
| 1,993,527 | Mears et al. | Mar. 5, 1935 |
| 1,993,707 | Rosecrans | Mar. 5, 1935 |
| 2,361,794 | Pryor | Oct. 31, 1944 |